(12) United States Patent
Harris

(10) Patent No.: US 12,446,732 B2
(45) Date of Patent: Oct. 21, 2025

(54) MULTI-ANGLE COOKING UTENSIL WITH REPLACEABLE IMPLEMENT

(71) Applicant: Charles D. Harris, Kalispell, MT (US)

(72) Inventor: Charles D. Harris, Kalispell, MT (US)

( * ) Notice: Subject to any disclaimer, the term of this patent is extended or adjusted under 35 U.S.C. 154(b) by 126 days.

(21) Appl. No.: 18/128,524

(22) Filed: Mar. 30, 2023

(65) Prior Publication Data
US 2023/0309754 A1    Oct. 5, 2023

Related U.S. Application Data

(60) Provisional application No. 63/326,651, filed on Apr. 1, 2022.

(51) Int. Cl.
*A47J 43/28* (2006.01)

(52) U.S. Cl.
CPC ................... *A47J 43/288* (2013.01)

(58) Field of Classification Search
CPC ........ A47J 43/288; A47G 21/045; A01D 1/04
USPC ..................... 294/7, 8; 30/321, 329
See application file for complete search history.

(56) References Cited

U.S. PATENT DOCUMENTS

| | | | | | |
|---|---|---|---|---|---|
| 1,021,444 | A | * | 3/1912 | Bates | A01D 1/04 30/353 |
| 1,073,565 | A | * | 9/1913 | Biehl | A01D 1/04 30/317 |
| 1,156,937 | A | * | 10/1915 | Sinnott | A01B 1/06 172/372 |
| 1,575,275 | A | * | 3/1926 | Pearson | A47J 43/283 294/8 |
| 1,940,169 | A | * | 12/1933 | Hinton | A01B 1/225 172/372 |
| 2,551,877 | A | * | 5/1951 | Ditto | A47J 43/283 294/7 |
| 2,621,957 | A | * | 12/1952 | Hartrampf | A47J 43/283 294/8 |
| 4,095,832 | A | * | 6/1978 | Slinker | A47J 43/283 99/402 |
| D286,576 | S | * | 11/1986 | Schneider | D28/7 |
| 5,104,166 | A | * | 4/1992 | Corsaro | A47J 43/283 294/8 |
| 6,193,289 | B1 | * | 2/2001 | Brown | A47J 43/283 294/8 |
| 7,182,377 | B2 | * | 2/2007 | Grundler | A47J 43/288 294/7 |

(Continued)

FOREIGN PATENT DOCUMENTS

JP    2020168337 A    10/2020

*Primary Examiner* — Paul T Chin
(74) *Attorney, Agent, or Firm* — Mitchell J. W. Vap

(57) ABSTRACT

The present invention is related to the fields of cooking and cooking utensils. The invention described herein is a novel multi-angle cooking utensil wherein the angle between a handle grip and a cooking implement can be adjusted according to user preference. Furthermore, cooking implements can be interchanged according to cooking task and user preference. The preferred embodiment is a spatula wherein the spatula blade angle in relation to the handle grip can be adjusted due to the novel gear set connection between the blade and handle grip portion. The blade can be removed for use without the handle. And, the blade can be removed to allow a different cooking implement to be connected to the handle grip for different cooking tasks.

15 Claims, 5 Drawing Sheets

(56) References Cited

U.S. PATENT DOCUMENTS

| | | | | |
|---|---|---|---|---|
| 7,644,644 | B2* | 1/2010 | Shikanai | B67B 7/38 |
| | | | | 7/152 |
| 10,398,261 | B2* | 9/2019 | Li | A47J 43/288 |
| 2006/0255606 | A1* | 11/2006 | Lemon | A47J 43/288 |
| | | | | 294/8 |
| 2012/0299254 | A1* | 11/2012 | Wanstrath | B25F 3/00 |
| | | | | 279/143 |
| 2015/0093480 | A1* | 4/2015 | Biever | A47J 43/28 |
| | | | | 294/7 |
| 2015/0272362 | A1* | 10/2015 | Lisek | A47J 43/288 |
| | | | | 294/7 |

\* cited by examiner

MULTI-ANGLE COOKING UTENSIL WITH REPLACEABLE IMPLEMENT

CROSS REFERENCE TO RELATED APPLICATIONS

This is a U.S. Nonprovisional application, which claims priority from U.S. Provisional Application No. 63/326,651 filed Apr. 1, 2022, the disclosure of which is hereby incorporated by reference in its entirety to provide continuity of disclosure.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The invention described herein relates to the fields of cooking and cooking utensils. Spatulas are common cooking utensils generally utilized to move foods during cooking. Spatulas generally consist of a handle connected centrally to a proximal first end of a rectangular or elongated blade portion, wherein the user wields the handle to utilize the spatula. A spatula is generally utilized by sliding the distal second end of the blade portion under food to move the food around the cooking surface, flipping the food over to cook a non-cooked surface, or to remove the food from the cooking surface.

Spatulas in the prior art share some common characteristics, which decrease their utility. First, the connection between the handle and blade portion of spatulas in the prior art is fixed. As such, when either the handle or the blade portion of a traditional spatula is damaged or wears out from use, the entire utensil is rendered useless and must be discarded. Second, the fixed angle between the handle and blade portion of a traditional spatula generally ranges from 0 degrees to approximately 20 degrees. The low, fixed angle of the handle and blade drastically reduces the traditional spatula's utility when foods need to be manipulated in deep pots or pans where the handle cannot clear the edge of the pot or pan to allow the user to utilize the blade portion as intended in the bottom of the pot or pan. Third, the fixed nature of the handle to blade connection of the traditional spatula leads to a user needing multiple spatulas of different sizes, shapes, and materials for different cooking applications. For example, a metal spatula blade is more suited to grill applications, whereas a silicone blade is more suited for non-stick cookware applications. Fourth, the central handle to proximal blade connection precludes any use of the proximal, or backside of the spatula blade during food manipulation or flipping. Fifth, the fixed nature of the handle to blade connection of the traditional spatula generally precludes any multifunctionality of the device.

BRIEF SUMMARY OF THE INVENTION

Due to the limitations of traditional cooking utensils, including spatulas stated above, a novel and improved multi-angle cooking utensil with a removeable implement is provided herein. The present invention is comprised of a novel handle, which is comprised of a proximal grip, which the user wields to utilize the utensil. Said grip is offset to the left or right side of the implement portion of the utensil, depending on user handedness, or preference. The ability to conform the utensil to user hand preference greatly enhances the user's cooking experience. A connecting bar is connected to the distal portion of the grip. The connecting bar connects the grip to the implement portion. The distal end of the connecting bar is comprised of a releasable connecting means, which connects to a corresponding releasable connecting means of the cooking implement. In the preferred embodiment, the releasable connecting means is comprised of a novel gear set, which is inserted into a corresponding gear set receiver of the proximal portion of the cooking implement. In a preferred embodiment, the connecting bar is curved to achieve the offset feature of the grip to the cooking implement. In the preferred embodiment, the distal gear set is at an approximate 90-degree angle to the distal curved portion of the bar; however, the gear set could be at other angles to achieve the desired function of the invention.

In addition to the novel handle and connecting bar, one embodiment of the invention is comprised of a novel spatula blade. The preferred embodiment of the spatula blade is comprised of a corresponding gear set receiver on either the right or left side of the proximal portion of the spatula blade, which receives the gear set of the connecting bar. As such, the handle can be connected to the implement to achieve any angle between 0 and 180-degrees between the handle and the implement. In one preferred embodiment, the ability to change the angle between the spatula handle and blade allows a user to utilize the spatula in deeper pans or other cooking vessels where a fixed angle spatula would not be able to be used. Furthermore, the handle connecting bar combination can be connected to the right or left side of the blade. In the preferred embodiment of the spatula blade, the proximal portion of the blade is thicker than the distal portion of the blade. As such, the blade is comprised of a gentle ramp from distal to proximal, which aids in keeping food on the blade during use. The gentle ramp feature, coupled with the full unobstructed proximal end of the spatula allows for flipping and manipulating foods with the proximal side of the blade. For example, the proximal portion of the blade can be used for pushing foods around on a cooking surface. Furthermore, the gentle ramp feature allows for foods to be easily and accurately flipped by simply tilting the distal portion of the blade upwards and allowing the food to slide proximally off of the ramped portion.

In addition to the features listed above, the novel multi-angle cooking utensil described herein provides further added benefits. Because the spatula blade portion can be removed from the connecting bar, the spatula blade can be used without the handle for scraping of food or spreading of certain foods such as frosting. Being able to disconnect the components of the device allows for easier cleaning of the components. The novel gear set gear set receiver connection between the handle, connecting bar, and distal cooking implement allows for attachment to virtually any distal cooking implement and/or handle. As such, one or two handles and connecting bars could accommodate virtually any cooking implement, which would drastically reduce the need for kitchen storage space. The novel releasable connecting means can also be utilized at the base of the handle to accommodate different handle shapes and sizes as well as virtually any angle or configuration of cooking utensil.

DETAILED DESCRIPTION OF THE INVENTION

Figure 1:
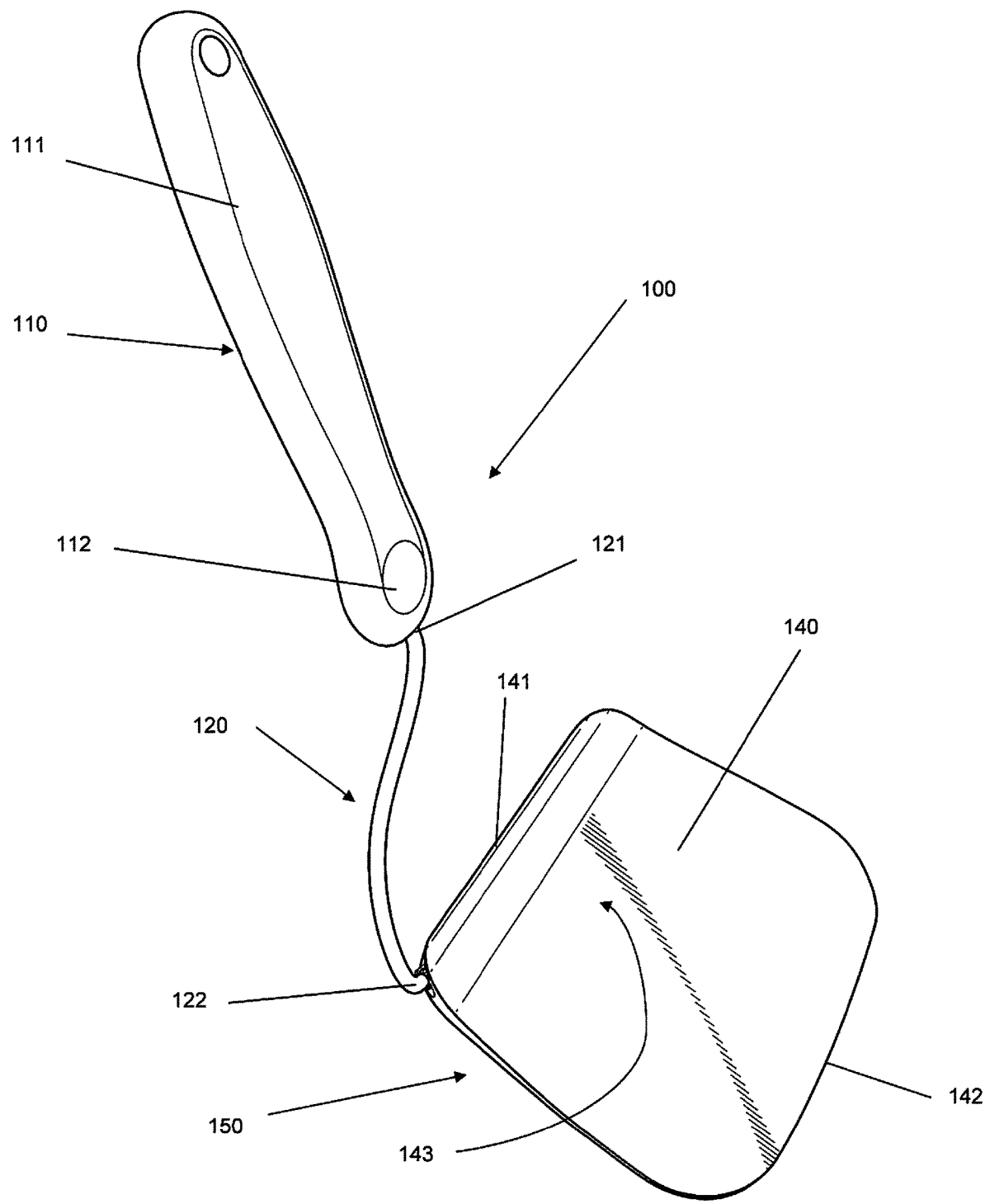
FIG. 1 is a perspective view of the device.
Figure 2:
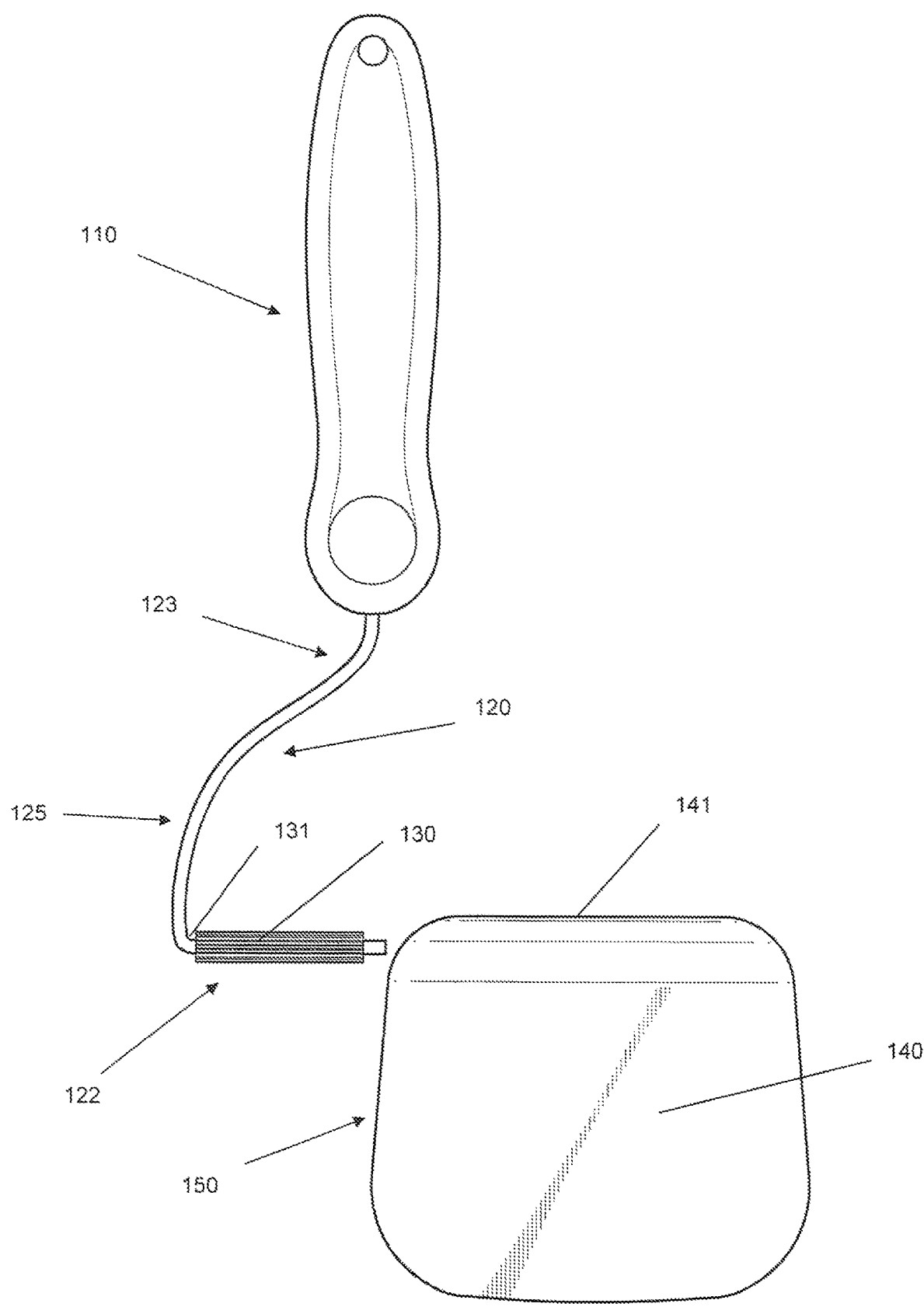
FIG. 2 is an overhead plan view of the device with handle detached from blade.
Figure 3:
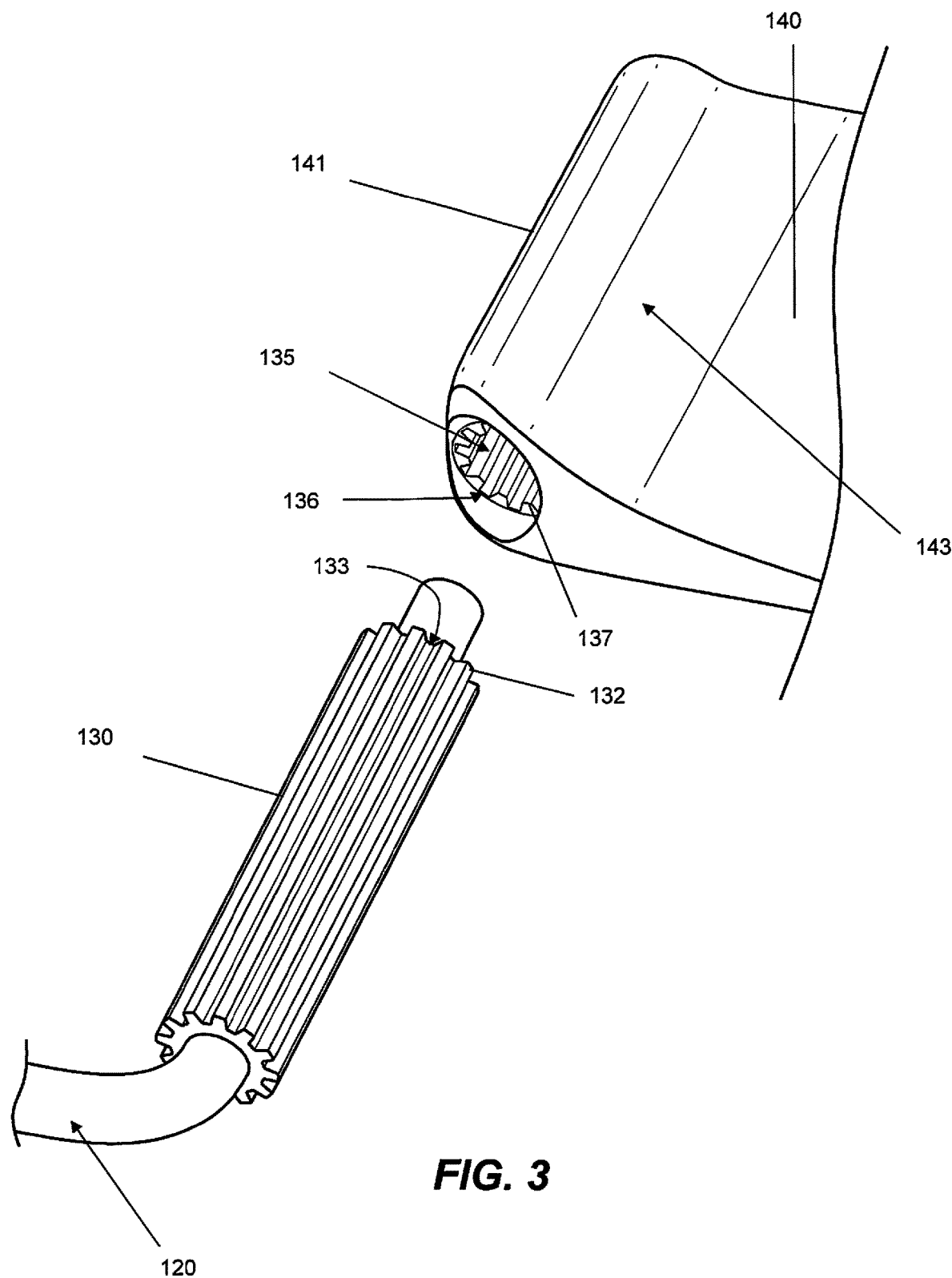
FIG. 3 is a perspective view showing detail of the novel gear set and gear set receiver of the blade detached.

Although only one embodiment of the invention is explained in detail, the figures and explanations should be understood as illustrations only and are not intended to limit the invention in its scope. Also, in describing the embodiment, specific terminology may be used, but it should be understood that specific terms include all technical equivalents that operate in similar manners to accomplish similar purposes.

With reference to the drawings, the preferred embodiment of the subject multi-angled utensil with removeable implement 100, is illustrated. The present invention is comprised of a handle 110, which is comprised of a proximal grip 111 and a distal end comprising a distal base 112. A user wields the grip 111 to utilize the device. Said grip 111 is offset to the left or right side of the spatula blade 140 of the device, depending on user handedness, or preference. A proximal end 121 of a novel connecting bar 120 is connected to the distal base 112 of the handle 110. A distal end 122 of said connecting bar 120 connects the connecting bar 120 to a cooking implement 150. In the preferred embodiment, said cooking implement 150 is comprised of a spatula blade 140. Said connecting bar 120 can be curved or straight. In the preferred embodiment, said connecting bar 120 is comprised of a proximal lateral concave curve 123, which transitions to a distal convex curve 125 to achieve the preferred lateral offset of said handle 110 and grip 111. The distal end 122 of the connecting bar 120 is further comprised of a releasable connecting means, which connects to a corresponding releasable connecting means of said cooking implement 150. In the preferred embodiment, the releasable connecting means is comprised of a novel gear insert 130, which is inserted into a corresponding gear insert receiver 135 of the proximal portion 141 of the spatula blade 140. In the preferred embodiment, the gear insert 130 is at an approximate 90-degree angle 131 to the distal convex curve 125 portion of the connecting bar 120; however, one familiar with the art would note the gear insert 130 could be set at other angles to achieve the desired function of the invention.

In addition to the features described above, the invention is comprised of a novel spatula blade 140. As noted above, the preferred embodiment of the spatula blade 140 is comprised of a corresponding gear insert receiver 135 on either the right or left lateral side of the proximal portion 141 of the spatula blade 140, which receives the gear insert 130 of the distal end 122 of the connecting bar 120. In the preferred embodiment, the gear insert 130 is comprised of an elongated cogwheel with a plurality of radially protruding gear insert teeth 132 between a gear insert bottom land 133 of each gear insert tooth 132. The gear insert receiver 135 is comprised of an elongated cogwheel shaped recess. When inserted into said gear insert receiver 135, each gear insert tooth 132 of said gear insert 130 corresponds with a gear insert receiver 135 bottom land 136 and each gear insert receiver teeth 137 correspond with each gear insert bottom land 133 to create a rigid connection between said connecting bar 120 and said spatula blade 140. One familiar in the art would recognize that said gear insert 130 and said gear insert receiver 135 could be configured in a multitude of corresponding shapes to achieve the releasable connection means function of the herein described device and such multitude of corresponding shapes are considered to be within the scope of this disclosure. For example only and without limiting the present disclosure, the gear insert 130 could be comprised of an elongated triangle, where each point of said elongated triangle is received by a corresponding triangular gear insert receiver 135. Or, an elongated triangle gear insert 130 could be received by a cogwheel configured gear insert receiver 135 where each point of a triangular gear insert 130 would be received by a cogwheel gear insert receiver 135 bottom land 136.

Figure 4:
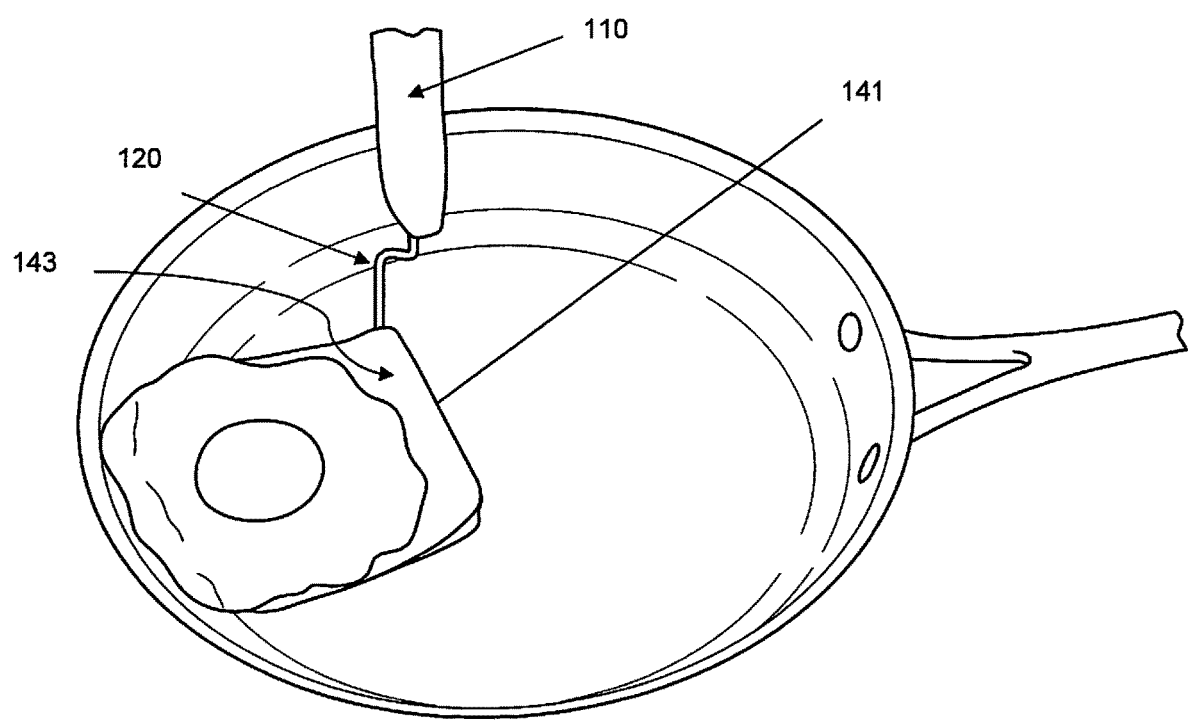
FIG. 4 is a perspective view of the device in 90 degree handle to blade configuration.
Figure 5:
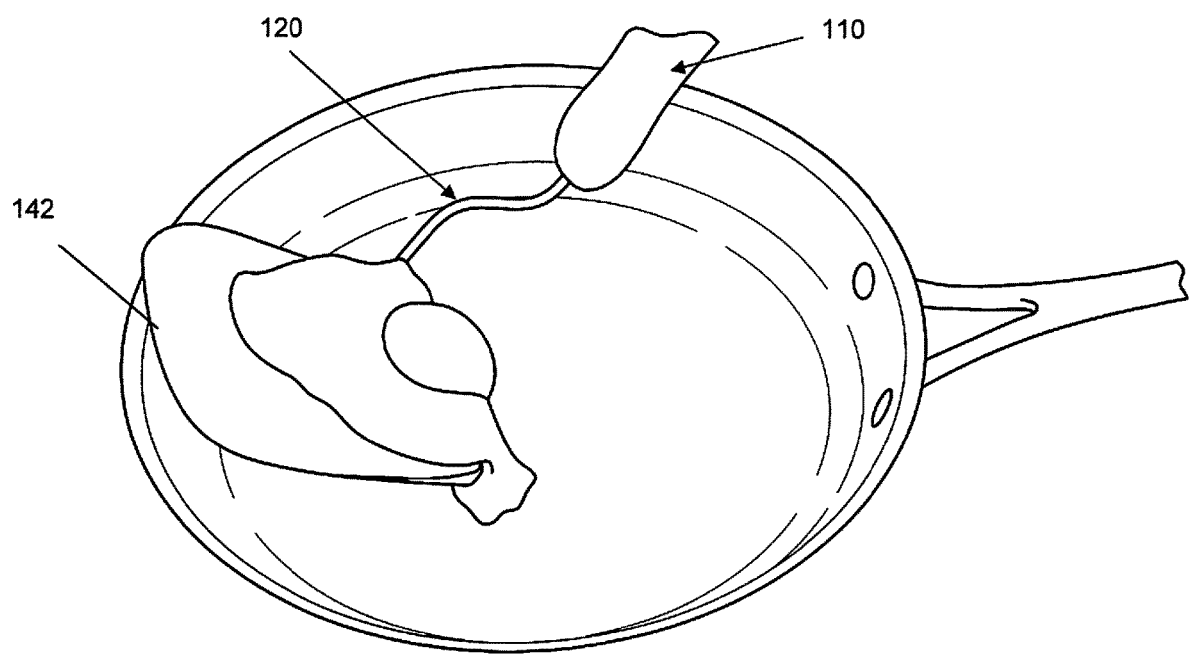
FIG. 5 is perspective view of the device in use demonstrating egg flip by tipping device and allowing egg to slide off of proximal ramp.

The gear insert 130 gear set receiver 135 connection allows the handle 110 connecting bar 120 combination to be connected to the spatula blade 140 to achieve virtually any angle between 0 and 180-degrees between said handle 110 connecting bar 120 and said spatula blade 140. Furthermore, the connecting bar 120 can be connected to the right or left side of the spatula blade 140. In the preferred embodiment of the spatula blade 140 the proximal portion 141 of the blade is thicker than the distal portion 142 of the blade. As such, the spatula blade 140 is comprised of a gentle ramp 143 from distal to proximal, which aids in keeping food on the spatula blade 140 during use as demonstrated in FIG. 4. The gentle ramp 143 feature, coupled with the full unobstructed proximal portion 141 of the spatula blade 140 allows for flipping and manipulating foods with the proximal portion 141 of the blade 140. For example, the proximal portion 141 of the blade can be used for pushing foods around on a cooking surface. Furthermore, the gentle ramp 143 feature allows for foods to be easily and accurately flipped by simply tilting the distal portion 142 of the blade 140 upwards and allowing the food to slide off of the gentle ramp 143 and proximal portion 142 of the blade 140 as shown in FIG. 5.

In addition to the features listed above, the novel multi-angle spatula 100 described herein provides further added benefits. Because the spatula blade 140 portion can be removed from the handle 110 connecting bar 120 portion, the spatula blade 140 can be used without the handle for scraping of food or spreading of certain foods such as frosting. Being able to disconnect the components of the device allows for easier cleaning of the components. The connection between the novel gear set 130 and gear set receiver 135 connection allows for attachment of virtually any cooking implement 150. As such only one or two handle 110 connecting bar 120 combinations would be needed to accommodate multiple different cooking implements 150, which would drastically reduce the need for kitchen utensil storage space.

One familiar with the art would also recognize that the releasable connection means gear set 130 gear set receiver 135 connection could also be utilized at the distal base 112 of the handle 110 to accommodate handles of different shapes and sizes. One familiar in the art would further recognize that the connecting bar 120 could be configured in varying curvatures and lengths. One familiar in the art would further recognize that virtually any cooking implement 150 could be fabricated to utilize the novel releasable connection means gear set 130 gear set receiver 135 feature to create virtually any cooking utensil according the principles described herein. For example, a slotted spoon could be created utilizing the principles described herein. A slotted spoon embodiment is comprised of said handle 110 and distal base 112 wherein a gear set receiver 135 would be disposed at the end of said distal base 112. A gear set 130 would be disposed at the proximal end of a connecting bar 120, which would connect to the gear set receiver 135 of the distal base 112 of the handle 110. For the slotted spoon embodiment, the connecting bar 120 would be configured as a straight linear connecting bar. At the distal end of the linear connecting bar a gear set 130 would be disposed to connect to a gear set receiver 135 disposed centrally at the proximal end of a slotted spoon implement. As such, one familiar with the art would recognize that the components of the invention described herein could be fashioned to create interchangeable configurations for virtually any kitchen utensil.

It is understood that the foregoing examples are merely illustrative of the present invention. Certain modifications of the articles and/or methods may be made and still achieve the objectives of the invention. Such modifications are contemplated as within the scope of the claimed invention. For example, one skilled in the art would recognize that the invention herein could be comprised of many different configurations of virtually any kitchen utensil.

What is claimed is:

1. A multi-angled utensil with removeable implement comprising:
    A. a handle, which is comprised of a proximal grip and a distal end;
    B. a connecting bar, comprising a proximal end of said connecting bar connected to the distal end of said handle and a distal end of said connecting bar, wherein;
    C. said distal end of said connecting bar is comprised of a releasable connecting means comprising a gear insert to connect said connecting bar to a corresponding releasable connecting means comprising a gear insert receiver of a cooking implement to create a rigid connection between said connecting bar and said cooking implement while connected.

2. The multi-angled utensil with removeable implement of claim 1, wherein said cooking implement is comprised of a spatula blade.

3. The multi-angled utensil with removeable implement of claim 2, wherein the proximal portion of said spatula blade is thicker than the distal portion of said blade.

4. The multi-angled utensil with removeable implement of claim 3, wherein said spatula blade is comprised of a gentle ramp from distal to proximal.

5. The multi-angled utensil with removeable implement of claim 2, wherein said handle and said spatula blade can be configured to a degree between 0 and 90-degrees between said handle and said spatula blade.

6. The multi-angled utensil with removeable implement of claim 1, wherein said connecting bar is curved.

7. The multi-angled utensil with removeable implement of claim 1, wherein said connecting bar is straight.

8. The multi-angled utensil with removeable implement of claim 1, wherein said connecting bar is comprised of a proximal lateral concave curve, which transitions to a distal convex curve.

9. The multi-angled utensil with removeable implement of claim 8, wherein said gear insert is at an approximate 90-degree angle to said distal convex curve of said connecting bar.

10. The multi-angled utensil with removeable implement of claim 1, wherein said gear insert receiver is located centrally on a proximal portion of said cooking implement.

11. The multi-angled utensil with removeable implement of claim 1, wherein said gear insert receiver is located on a left side of a proximal portion of said cooking implement.

12. The multi-angled utensil with removeable implement of claim 1, wherein said gear insert receiver is located on a right side of a proximal portion of said cooking implement.

13. The multi-angled utensil with removeable implement of claim 1, wherein said gear insert is comprised of an elongated cogwheel.

14. The multi-angled utensil with removeable implement of claim 13, wherein said gear insert receiver is comprised of an elongated cogwheel recess.

15. The multi-angled utensil with removeable implement of claim 1, wherein said handle and said implement can be configured to a degree between 0 and 180-degrees between said handle and said implement.

* * * * *